United States Patent [19]

Hicks et al.

[11] Patent Number: 4,975,293

[45] Date of Patent: *Dec. 4, 1990

[54] PROCESS FOR PRESERVING RAW FRUIT AND VEGETABLE JUICES USING CYCLODEXTRINS AND COMPOSITIONS THEREOF

[75] Inventors: Kevin B. Hicks, Glenside; Gerald M. Sapers, Warrington, both of Pa.; Paul A. Seib, Manhattan, Kans.

[73] Assignee: The United States of America as represented by the Secretary of Agriculture, Washington, D.C.

[ * ] Notice: The portion of the term of this patent subsequent to Mar. 21, 2006 has been disclaimed.

[21] Appl. No.: 141,857

[22] Filed: Jan. 11, 1988

[51] Int. Cl.$^5$ ................................. A23L 2/02
[52] U.S. Cl. .................. 426/271; 426/333; 426/599; 426/330.5
[58] Field of Search ............ 426/350.5, 333, 599, 426/541, 271, 51, 52; 210/502.1, 635

[56] References Cited

U.S. PATENT DOCUMENTS

| | | | |
|---|---|---|---|
| 3,453,257 | 7/1969 | Parmerter | 210/502.1 |
| 3,754,938 | 8/1973 | Ponting | 99/154 |
| 3,764,348 | 10/1973 | Huxsoll et al. | 426/310 |
| 4,332,825 | 6/1982 | Miyawaki | 426/330.5 |
| 4,426,292 | 1/1984 | Werneck | 210/635 |
| 4,539,399 | 9/1985 | Armtrong | 210/502.1 |
| 4,647,672 | 3/1987 | Seib et al. | 549/222 |

FOREIGN PATENT DOCUMENTS

| | | | |
|---|---|---|---|
| 55-92702 | 7/1980 | Japan . | |
| 56-124367 | 9/1981 | Japan . | |
| 57-50850 | 3/1982 | Japan | 426/541 |
| 57-177671 | 11/1982 | Japan . | |
| 194774 | 11/1982 | Japan | 426/333 |
| 59-232054 | 12/1984 | Japan | 426/599 |
| 62-171661 | 7/1987 | Japan | 426/599 |

OTHER PUBLICATIONS

Pszczola 1988, Food Technology, Jan. 1988, pp. 96-100.
Lee 1975 Basic Food Chemistry, pp. 173-178, AVI Publishing Co., Westport CT.
Anon, 1987 Food Engineering, Jul. 1987, pp. 36, 38.
Nagatomo 1985, Chemical Economy and Engineering Review Jul./Aug. 17, No. 7-8, (No. 190), pp. 28-35.
C. H. Lee et al., "Chemical Synthesis of Several Phosphoric Esters of L-Ascorbic Acid," Carbohydr. Res., 67: 127-138, (1978).
R. C. Cousins et al., "Synthesis of 6-Fatty Acid Estes of L-Ascorbic Acid," J. Am. Oil Chem. Soc., 54: 308-312, (1977).
P. E. Shaw et al., "Improved Flavor of Naval Orange and Grapefruit Juices by Removal of Bitter Components with -Cyclodextrin Polymer," J. Agri. Food Chem., 32: 832-836, (1984).
K. Otta et al., "Cyclodextrin Polymers as Specific Sorbents," Proceeding from the 1st Int. Symp. on Cyclodextrins, Budapest, pp. 357-362, (1981).
Kanebo, Ltd., "Comestics", Chemical Abstracts, vol. 93: 191911a, p. 351, (1980).
Toyobo Co., Ltd., "Inclusion Compounds of Fatty Acids Esters of Ascorbic Acid with B-cyclodextrin," Chemical Abstracts, vol. 94: 84453b, p. 761, (1981).

Primary Examiner—Carolyn Paden
Attorney, Agent, or Firm—M. Howard Silverstein; Beverly K. Johnson; John D. Fado

[57] ABSTRACT

A process of inhibiting enzymatic browning in raw fruit and vegetable juices comprising treating the juices with cyclodextrins, individually or in combination. Soluble cyclodextrins treatments may be added directly to the juices. In the alternative, isoluble cyclodextrins may be used as a packing in a column or in a batch treatment process. In effect, treatments of the invention tend to limit the extent or rate of enzymatic browning in the affected juices. Also disclosed are novel browning inhibiting compositions which are effective in controlling enzymatic browning in raw fruit and vegetable juices. The novel compositions are potential alternatives for presently used sulfites.

28 Claims, No Drawings

PROCESS FOR PRESERVING RAW FRUIT AND VEGETABLE JUICES USING CYCLODEXTRINS AND COMPOSITIONS THEREOF

BACKGROUND OF THE INVENTION

1. Field of the Invention

The present invention relates to the preservation of raw fruit and vegetable juices. More particularly, the present invention relates to the use of cyclodextrins and compositions thereof, to control enzymatic browning in raw fruit and vegetable juices.

2. Description of the Prior Art

Browning of raw fruits and vegetables due to mechanical injury, e.g., peeling, cutting, slicing, crushing etc., during postharvest processing has caused major losses in quality and value in the affected commodities. This enzymatic browning results from the polyphenol oxidase-catalyzed oxidation of phenolic compounds to O-quinones which sequentially polymerize to form dark-colored pigments.

Heretofore, efforts to control enzymatic browning in unblanched, cut fruits and vegetables have primarily involved sulfite treatments to preserve their natural color. However, recent concerns over the adverse health effects from sulfites has stimulated much research to develop effective sulfite substitutes. A number of sulfite substitutes, mostly combinations of ascorbic or erythorbic acid with citric acid, phosphates and chlorides, have been developed. These formulations, however, do not usually provide the extended protection obtained with sulfites. This deficiency is due largely to the rapid oxidation of ascorbate or erythorbate, catalyzed by endogenous enzymes and copper in the raw commodity.

Consequently, there exists a need in the food industry for sulfite alternatives which are safe, economical and effective.

SUMMARY OF THE INVENTION

We have now developed a process of preserving raw fruit and vegetable juices by controlling enzymatic browning in these commodities. The invention process involves subjecting the fruit and vegetable juices to certain cyclodextrins for a period of time sufficient to inhibit browning. The treatments are safe and offer a suitable alternative to the use of potentially toxic sulfite treatments to preserve these commodities.

Accordingly, it is an object of the present invention to provide a novel process for preserving raw fruit and vegetable juices.

Another object is to provide a process for preserving these fruit and vegetable products without the use of sulfites.

Further, it is an object of the invention to provide novel browning inhibiting compositions useful to inhibit enzymatic browning in raw fruit and vegetable juices.

In general, we have accomplished the foregoing objects by providing a process for preserving raw fruit and vegetable juices comprising subjecting the juices to an effective antibrowning amount of an antibrowning compound selected from the group consisting of (a) a soluble cyclodextrin; and (b) an insoluble cyclodextrin. In effect, the treatments in accordance with the invention decrease the extent or rate of enzymatic browning in the affected commodities.

DETAILED DESCRIPTION OF THE INVENTION

For purposes of the invention, the term cyclodextrin is used herein to define a cyclic oligosaccharide, and derivatives thereof, having the structural formula

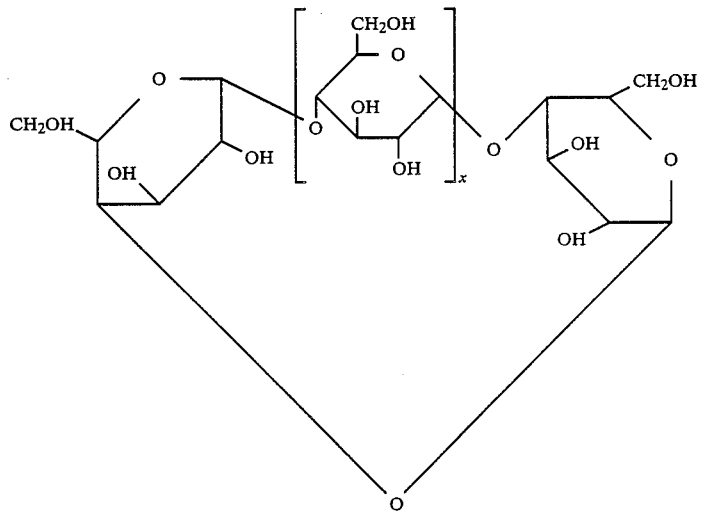

wherein alpha cyclodextrin, beta cyclodextrin and gamma cyclodextrin are $X=4$, 5, and 6, respectively. The term "soluble cyclodextrin" is used herein to designated a cyclodextrin which is soluble in an aqueous medium. The term "insoluble cyclodextrin" is used herein to designate a cyclodextrin that is insoluble in an aqueous medium.

Soluble cyclodextrins useful in the invention process include alpha, beta and gamma cyclodextrins. In addition, soluble cyclodextrins include those derivatives of alpha, beta and gamma cyclodextrins having one or more groups attached to the parent cyclic structure through covalent linkage with the oxygen atoms located on carbons 2, 3, or 6 of any of the glucose units comprising the 6, 7, or 8 membered cyclic ring. As few as one group or as many as 18, 21, or 24 polar groups may be attached to an alpha, beta or gamma cyclodextrin molecule, respectively. Suitable polar groups may be any polar structure which improves the water solubility of the cyclodextrin molecule. Exemplary polar groups include, but are not limited to, monosaccharides, disaccharides and oligosaccharides, such as glucose, maltose, maltotriose units and the like. Other useful polar groups include hydroxyalkyls, wherein the alkyls are lower alkyls having from 1 to 5 carbon atoms, i.e. hydroxyethyl, hydroxypropyl and hydroxybutyl and the like.

An insoluble cyclodextrin useful in the process of the invention is a cyclodextrin polymer prepared by cross-linking beta cyclodextrin with the reagent epichlorohydrin using the procedure as described in Shaw et al. [J. Agr. Food Chem. 32: 832–836 (1984)]. Other insoluble cyclodextrins useful in the invention process are cyclodextrin polymers comprising an alpha, beta or gamma cyclodextrin attached by covalent bonds to an inert support such as cellulose, silica gel, or the like. Such cyclodextrin polymers maybe prepared by the procedure as described in K. Otta et al. [1st. Int. Symp. on Cyclodextrins, Budapest (1981)].

It is within the compass of the invention to use the cyclodextrins either individually or in combination. For optimum results, the compounds should be used in substantially pure form, that is, free of undersirable contaminants that tend to mask or otherwise inhibit their effectiveness as browning inhibitors.

In accordance with the invention process, cyclodextrins may also be used in combination with other browning inhibiting agents, such as ascorbic acid, erythorbic acid, ascorbic acid-2-phosphate esters and ascorbyl-6-fatty acid esters. The ascorbic acid-2-phosphate esters useful in the invention process are those esters in which the hydroxyl group located on the number 2 carbon atom of ascorbic acid has been esterified with a phosphoric acid. Examples of such esters include ascorbic acid-2-phosphate, ascorbic acid-2-diphosphate, ascorbic acid-2-triphosphate and ascorbic acid-2-polyphosphate. The phosphate esters of ascorbic acic may be prepared by reacting ascorbic acid with salts of a metaphosphoric acid in accordance with the procedure as described in Seib et al., U.S. Pat. No. 4,647,672, issued Mar. 3, 1987. Ascorbic acid-2-phosphate may also be prepared by the condensation of ascorbic acid and phosphoric acid using the procedure as described in Lee et al. [Carbohydrate Res. 67: 127–138 (1978)].

The ascorbyl-fatty acid esters useful in the invention process are those esters in which the hydroxyl group located on the number 6 carbon atom of ascorbic acid is reacted with a fatty acid. Suitable fatty acids include palmitic, lauric, decanoic, octanoic acids and the like. The ascorbyl-6-fatty acid esters may be prepared by reacting ascorbic acid with excess fatty acid in accordance with the procedure as described in R. C. Cousins et al. [J. Am. Oil Chem. Soc. 54: 308–312 (1977)]. When using ascorbyl-fatty acid esters, it may be necessary to dissolve the ester in an ethanolic solution and to include therein conventional additives, such as emulsifiers and dispersing agents, to aid in the solubility of the esters. Suitable emulsifiers include, but are not limited to, monoglycerides, dglycerides, glycol esters of fatty acids, polyglycol esters of fatty acids and mixtures thereof. Suitable dispersing agents include xanthan gum, carboxymethylcellulose, guar gum, pectin and the like.

Cyclodextrins useful in the invention process may also be used in combination with a polyphenol oxidase inhibitor, i.e. citric acid or the like. The cyclodextrin compositions may also contain a chelating agent, such as an acidic polyphosphate having a 1:1 ratio of $P_2O_5$:$Na_2O$ and the like. Further, the cyclodextrin compositions may be used in combination with an acidulant, i.e. any food-grade additive which serves to lower the pH of the compositions to a value that is below the optimal pH value for polyphenol oxidase. Suitable acidulants include citric acid, lactic acid and the like. When used, all additives mentioned herein should be used in concentrations which as readily determined by one skilled in the arts, will not interfere with the effectiveness of the cyclodextrins as browning inhibitors.

In use, soluble cyclodextrins may be dissolved directly in juice systems in any effective antibrowning amount. Beta cyclodextrins have a limited solubility in aqueous media and are added in relatively low concentrations. Exemplary concentrations of beta cyclodextrins in aliquots of juice may range from about 0.3% to about 1.3%. Alpha and gamma cyclodextrins have a higher solubility than beta cyclodextrin and may be added in higher concentrations to enhance their effectiveness. For example, concentrations of alpha and gamma cyclodextrins may range from about 1% to about 14.5% and 23.2%, respectively. Cyclodextrins substituted with one or more polar groups may be dissolved in even higher concentrations, up to approximately 50% in aliquots of juice, because of their increased solubility. Although effective, higher concentrations of cyclodextrins may be unnecessary and impractical for the intended purpose.

Insoluble cyclodextrins are preferably used as packing materials in columns for continuous juice treatment and, in the alternative, in a batch treatment process. As a column packing, the immobilized cyclodextrin entraps browning-related compounds, i.e. phenolic compounds, as the targeted juice is passed through the column. In a batch treatment process, the insoluble cyclodextrins are added to the juice and stirred. Thereafter, the insoluble cyclodextrin is filtered from the juice along with browning-related compounds complexed therewith.

The process of the invention is useful to preserve the storage life of any raw fruit or vegetable juice which undergoes enzymatic browning, i.e., polyphenol oxidase oxidation of polyphenols. Consequently, the invention process is useful to preserve the juices of a variety of raw fruits and vegetables including, but not limited to, apples, pears, grapes, celery and the like.

The process of the invention is further demonstrated by the following examples which are intended only to further illustrate the invention and not to limit the scope of the invention as defined by the claims.

EXAMPLE 1

The effectiveness of various cyclodextrins and combinations thereof with ascorbic acid, ascorbic acid-2-phosphate esters and ascorbyl-6-fatty acid esters, were evaluated in a raw apple juice system.

Apple samples representing common cultivars were obtained from local food stores during 1986–87 and stored briefly at 4° C. until used. One hour prior to use, fruits were removed from refrigeration and equilibrated at room temperature (ca 20° C.).

Juice samples were prepared from individual Granny Smith apples with an Acme Supreme Model 6001 Juicerator. The freshly prepared juices from 2 or 3 apples were combined, briefly stirred to ensure uniformity, and then rapidly dispersed by burette into cylindrical clear glass optical cells containing the targeted browning inhibitor.

Colorimetry of the juice samples was performed with the optical cell placed over the sample port of a Gardner XL-23 Tristimulus Colorimeter or a Pacific Scientific Spectrocolorimeter. Tristimulus values were recorded at frequent intervals up to 24 hours and were plotted against time. Lag times, i.e. the time before the onset of browning, were obtained from these graphs by direct measurement.

Alternatively, browning in apple juice was determined spectrophotometrically by taking, at 15 minute intervals, 10 ml aliquots of a 100–125 ml juice sample which was continually mixed slowly by stirring. Immediately thereafter, the aliquots were clarified by a modification of the method of Meydav et al. [J. Agric. Food Chem. 25:602 (1977)] which entails rapid mixing with an equal volume of 95% ethanol and 0.3 g Celite Analytical Filter Aid (Fisher Scientific, Pittsburgh, Pa.) followed by filtration through Whatman No. 50 paper under suction. The absorbance of the filtrates was determined at 420 nm with a Perkin-Elmer Model 552 UV-visible spectrophotometer (Perkin-Elmer, Oak Brook, Ill.).

The effectiveness of the treatments was expressed in terms of percent inhibition. For purposes of the invention, percent inhibition is defined as the change in the reflectance (L-value), or in the alternative, absorbance ($A_{420}$) of the treated sample over a specified time interval, ($\Delta L$ treatment) or ($\Delta A_{420}$ treatment), subtracted from the change in reflectance or absorbance in the corresponding untreated control, ($\Delta L$ control) or ($\Delta A_{420}$ control), expressed as a percentage of the change in the control. For example, the percent inhibition based on the change in reflectance was calculated as follows:

$$\% \text{ Inhibition} = \frac{\Delta L \text{ control} - \Delta L \text{ treatment}}{\Delta L \text{ control}} \times 100$$

A percent inhibition value of 100 indicates complete inhibition of browning while a value of 0 indicates no inhibition. Results are recorded in Table I below.

When dissolved in raw Granny Smith apple juice, beta cyclodextrin inhibited enzymatic browning for more than 1 hour with the extent of browning inhibition increasing with beta cyclodextrin concentrations between 5.9 and 13.6 mM in juice (Table I, expt. 1). Alpha and gamma cyclodextrin also exhibited an antibrowning effect although to a lesser extent than beta cyclodextrin. The inhibitory effect of beta cyclodextrin on browning in juice was further enhanced by combining beta cyclodextrin with ascorbic acid (Table I, Expts. 2–5). With the exception of the combination, 5.9 mM beta cyclodextrin and 0.57 nM ascorbic acid, combinations of beta cyclodextrin with ascorbic acid were significantly more effective than beta cyclodextrin alone. Beta cyclodextrin-ascorbic acid combinations remained effective after two hours while samples treated with ascorbic acid alone failed after only 30 minutes. Improvements in the beta cyclodextrin treatments were further realized by substituting equimolar concentrations of ascorbic acid-2phosphate and ascorbyl palmitate, respectively, for ascorbic acid (Table I, Expt. 6). In direct comparision, the combination of beta cyclodextrin with ascorbic acid-2-phosphate was greatly superior to ascorbic acid alone (Table I, Expt. 7). Variation in treatment response between experiments was due largely to apple-to-apple variability in the extent of browning, as seen in the control $A_{420}$ values at 60 minutes for each experiment.

EXAMPLE 2

Cyclodextrin combinations with citric acid, ascorbic acid or an acidic polyphosphate, were evaluated in Granny Smith Juice using the procedure as described in Example 1. The acidic polyphosphate used in the experiment has a 1:1 ratio of $P_2O_5:Na_2O$ and was obtained from International Sourcing Inc., of Ridgewood, N.J. under the trade name of "Sporix". Treatment A comprised a mixture of cyclodextrins comprising 13.12% beta cyclodextrin, 49.62% maltosyl-beta cyclodextrin, and 27.7% dimaltosyl-beta cyclodextrin. Treatment B comprised a mixture of alpha, beta and gamma cyclodextrins having a 6:3:1 by weight ratio of alpha:beta:gamma cyclodextrins, wherein more than 50% of the mixture consists of maltosyl derivatives of the respective cyclodextrins and wherein more than 80% of the solid substance weight of the mixture comprise cyclodextrins. Both mixtures A and B were obtained commercially from the Ensuiko Sugar Refining Co., LTD., of Yokohama, Japan. Mixture B is sold under the tradename "ISOELEAT".

Results are recorded in Table II.

As shown in Table II, mixture A was highly effective in inhibiting browning in Granny Smith apple juice. When used in a 1% concentration in juice, mixture A was similar in antibrowning effect to beta cyclodextrin. At a level of 4%, the effectiveness of mixture A was enhanced over that of the lower concentration. The effectiveness of mixture A at either concentration, 1% or 4%, was further enhanced by the addition of Sporix, citric acid, or ascorbic acid. Mixture B also effectively inhibited browning, although to a lesser extent than equivalent concentrations of mixture A. As with mixture A, combinations of mixture B with Sporix, ascorbic acid, or citric acid were more effective than mixture B alone. In particular, the combination of mixture B with both citric acid and ascorbic acid was highly effective in inhibiting browning for more than 24 hours. Because of their high solubility, it is suggested that either mixture A or mixture B could be used in concentrations higher than 4% to achieve a desired level of browning inhibition.

EXAMPLE 3

Fresh juice was prepared from green grapes, Granny Smith apples, Anjou pears, and celery using the procedure as described in Example 1. A 25 ml portion was percolated through a 15 cm long, 2 cm diameter glass column containing 15 ml of a cyclodextrin polymer comprising beta cyclodextrin crosslinked with epichlorohydrin. The cyclodextrin polymer was obtained commercially from the American Maize Corporation of Hammond, Ind. A 25 ml portion of the untreated juice was used as a control. Results are recorded in Table III.

The superior effectiveness of the immobilized cyclodextrin polymer when used as a packing material for columns was clearly shown in Table III. For instance, treated apple juice which exited the columns failed to undergo enzymatic browning for more than 82 hours. After 82 hours the experiment was discontinued because of microbial growth. In comparision, untreated samples of the juice browned within one hour. It will be obvious to one skilled in the arts that it maybe necessary to treat some juices with successive or repetitive column treatments in order to completely remove all of the phenolic substrates from the targeted juices.

It is understood that modifications and variations may be made to the foregoing disclosure without departing from the spirit and scope of the invention.

TABLE I

Inhibition of enzymatic browning in Granny Smith juice by cyclodextrins and combinations of cyclodextrins with ascorbic acid and ascorbic acid derivatives

| Expt. | Treatment[a] | Percent Inhibition[b] | | | | $A_{420}$ of control at 60 min |
|---|---|---|---|---|---|---|
| | | 30 min | 60 min | 90 min | 120 min | |
| 1 | 6.8 mM α-CD | 60 | 21 | — | — | 0.19 |
| | 27.2 mM α-CD | 26 | 36 | — | — | 0.22 |
| | 5.9 mM β-CD | 73 | 60 | — | — | 0.26 |
| | 13.6 mM β-CD | 92 | 90 | — | — | 0.18 |
| | 5.2 mM γ-CD | 1 | −8 | — | — | 0.19 |
| | 10.2 mM γ-CD | 34 | 16 | — | — | 0.19 |
| 2 | 5.9 mM β-CD | 100 | 87 | 74 | — | 0.18 |
| | 5.9 mM β-CD + 0.57 mM AA | 99 | 75 | 71 | — | 0.18 |
| | 0.57 mM AA | 14 | −1 | 12 | — | 0.18 |
| 3 | 11.8 mM β-CD | 81 | 85 | 86 | 83 | 0.16 |
| | 11.8 mM β-CD + 0.57 mM AA | 95 | 95 | 93 | 86 | 0.16 |
| | 0.57 mM AA | 66 | 13 | 5 | −10 | 0.16 |
| 4 | 5.9 mM β-CD | 86 | 70 | 63 | 57 | 0.22 |
| | 5.9 mM β-CD + 1.14 mM AA | 100 | 100 | 68 | 65 | 0.22 |
| | 1.14 mM AA | 98 | 22 | 5 | −1 | 0.22 |
| 5 | 11.8 mM β-CD | 92 | 96 | 91 | 85 | 0.20 |
| | 11.8 mM β-CD + 1.14 mM AA | 103 | 101 | 102 | 95 | 0.20 |
| | 1.14 mM AA | 97 | 44 | 19 | 10 | 0.20 |
| 6[c] | 5.9 mM β-CD + 0.57 mM AAP | 98 ± 3 | 90 ± 4 | 88 ± 2 | 83 ± 3 | 0.33 |
| | 5.9 mM β-CD + 0.57 mM AP | 104 ± 4 | 95 ± 6 | 90 ± 8 | 85 ± 8 | 0.33 |
| | 5.9 mM β-CD + 0.57 mM AA | 98 ± 3 | 80 ± 3 | 66 ± 4 | 57 ± 3 | 0.33 |
| 7[d] | 5.9 mM β-CD + 0.57 mM AAP | 100 ± 2 | 97 ± 3 | 92 ± 4 | 89 ± 5 | 0.23 |
| | 0.57 mM AA | 78 ± 4 | 30 ± 4 | 18 ± 4 | 16 ± 2 | 0.23 |

[a]AA = ascorbic acid, CD = cyclodextrin, AAP = ascorbic acid-2-phosphate, AP = ascorbyl palmitate.
[b]Based on change in absorbance at 420 mm.
[c]Mean percent inhibition and standard deviation for 6 replicates.
[d]Mean percent inhibition and standard deviation for 4 replicates.

TABLE II

Inhibition of Enzymatic Browning in Granny Smith Juice by Cyclodextrin and Combinations Thereof with Citric Acid, Ascorbic Acid, and Sporix

| | % Inhibition [b] | | | | | |
|---|---|---|---|---|---|---|
| | L - Values | | | a - Values | | |
| Treatment [a] | 2 hr | 6 hr | 24 hr | 2 hr | 6 hr | 24 hr |
| 1% β-CD[c] | 99 | 50 | 30 | 69 | 43 | 33 |
| 1% β-CD + 0.25% Sporix | 100 | 100 | 100 | 66 | 75 | 70 |
| 1% A[c] | 100 | 62 | 22 | 77 | 54 | 29 |
| 1% A[c] + 0.25% Sporix | 100 | 100 | 88 | 96 | 94 | 91 |
| 1% A[c] + 0.25% CA | 100 | 65 | 60 | 48 | 41 | 35 |
| 4% A[c] | 100 | 100 | 86 | 96 | 89 | 66 |
| 4% A[c] + 0.25% Sporix[c] | 94 | 95 | 74 | 93 | 94 | 92 |
| 4% A[c] + 0.02% AA | 100 | 100 | 79 | 95 | 95 | 93 |
| 4% A[c] + 0.5% CA | 100 | 100 | 100 | 84 | 87 | 70 |
| 4% B[c] | 65 | 40 | 27 | 58 | 58 | 48 |
| 4% B[c] + 0.25% Sporix[c] | 100 | 100 | 83 | 96 | 97 | 94 |
| 4% B[c] + 0.02% AA | 100 | 100 | 33 | 100 | 100 | 54 |
| 4% B[c] + 0.5% CA | 84 | 76 | 60 | 59 | 59 | 50 |
| 4% B[c] + 0.25% CA + 0.02% AA | 100 | 100 | 89 | 100 | 100 | 97 |

[a]β-CD = Beta Cyclodextrin; CA = Citric Acid; AA = Ascorbic Acid; A = a mixture containing 50% maltosyl-β-CD, 28% di-maltosyl-βCD, and 13% B-CD; B = a mixture comprised of α:β:Y CD'S in a 6:3:1 by weight ratio, wherein 50% of the CD'S have maltosyl side chains. Mixtures A and B were obtained from Ensuiko Sugar Co., Japan.
[b]Based on difference in L- or a- value between specified time and 5 min.
[c]Mean of 2 replicates

TABLE III

Inhibition of Enzymatic Browning in Fruit and Vegetable Juices Using a Cyclodextrin Polymer as Packing in an Affinity Column.

| Fruit | Sample | Elapsed time before browning was detected |
|---|---|---|
| grapes | untreated | 4 hours |
| | treated | >72 hours* |
| apple | untreated | 1 hour |
| | treated | >82 huurs* |
| pear | untreated | 20 minutes |
| | treated | >60 hours* |
| celery | urtreated | 24 hours |
| | treated | >48 hours |

*At this point the sample contained visible amounts of mold and the experiment was terminated. No browning was detected.

We claim:

1. A process for preserving raw fruit and vegetable juices during storage, comprising:
   treating a raw fruit or vegetable juice subject to enzymatic browning with an effective antibrowning amount of a browning inhibitor comprising a soluble cyclodextrin or an insoluble cyclodextrin; and, storing the thus treated raw juice for a time sufficient for enzymatic browning to occur in the untreated raw juice but with enzymatic browning inhibited in the thus treated raw juice.

2. The process of claim 1 wherein the soluble cyclodextrin is selected from the group consisting of (a) alpha cyclodextrin; (b) beta cyclodextrin; (c) gamma cyclodextrin; (d) derivatives thereof having one or more polar groups attached by covalent linkage to the oxygen atoms located on carbons 2, 3, or 6 of any of the glucose units comprising the alpha, beta and gamma cyclodextrin molecules, respectively; and (e) combinations thereof.

3. The process of claim 2 wherein the polar groups are selected from the group consisting of monosaccharides, disaccharides, and oligosaccharides.

4. The process of claim 2 wherein the polar groups are hydroxyalkyls wherein the alkyls have from 1 to 5 carbon atoms.

5. The process of claim 2 wherein the browning inhibitor is added directly to the juice.

6. The process of claim 1 wherein the browning inhibitor further comprises an antibrowning agent selected from the group consisting of (a) ascorbic acid; (b) erythorbic acid; (c) ascorbic acid-2-phosphate esters; (d) ascorbyl-6-fatty acid esters; and (e) combinations thereof.

7. The process of claim 1 wherein the browning inhibitor further comprises a polyphenol oxidase inhibitor.

8. The process of claim 1 wherein the browning inhibitor further comprises a chelating agent.

9. The process of claim 8, wherein the chelating agent is an acidic polyphosphate having a 1:1 ratio of $P_2O_5$:$Na_2O$.

10. The process of claim 1 wherein the juice is selected from the juices of the group of fruits and vegetables consisting of apples, pears, grapes and celery.

11. A process for preserving raw fruit and vegetable juices comprising treating a raw fruit or vegetable juice subject to enzymatic browning with an effective antibrowning amount of a browning inhibitor comprising a soluble cyclodextrin and an antibrowning agent selected from the group consisting of ascorbic acid-2-phosphate esters, ascorbyl-6-fatty acid esters, and combinations thereof.

12. The process of claim 11 wherein the ascorbic acid-2-phosphate esters are selected from the group consisting of ascorbic acid-2-phosphate, ascorbic acid-2-diphosphate, ascorbic acid-2-triphosphate and ascorbic acid-2-polyphosphate.

13. The process of claim 11 wherein the fatty acids of the ascorbyl-6-fatty acid esters are selected from the group consisting of palmitic, lauric, decanoic and octanoic acids.

14. A process for preserving raw fruit and vegetable juices comprising treating a raw fruit or vegetable juice subject to enzymatic browning with an effective antibrowning amount of a browning inhibitor comprising an insoluble cyclodextrin selected from the group consisting of (a) a cyclodextrin polymer comprising beta cyclodextrin crosslinked with epichlorohydrin; and (b) a cyclodextrin polymer comprising a cyclodextrin molecule covalently bonded to an inert support.

15. The process of claim 14 wherein the cyclodextrin molecule is selected from the group consisting of alpha cyclodextrin, beta cyclodextrin and gamma cyclodextrin.

16. The process of claim 14 wherein the inert support is selected from the group consisting of cellulose and silica gel.

17. The process of claim 14 wherein the juice is treated with the browning inhibitor in a batch treatment process.

18. The process of claim 14 wherein the juice is passed through a column packed with the browning inhibitor.

19. A browning inhibiting composition useful for preserving raw fruit and vegetable juices, wherein said composition comprises a soluble cyclodextrin and an ascorbic acid-2-phosphate ester.

20. The browning inhibiting composition of claim 19 wherein the ascorbic acid-2-phosphate ester is selected from the group consisting of ascorbic acid-2-phosphate, ascorbic acid-2-diphosphate, ascorbic acid-2-triphosphate and ascorbic acid-2-polyphosphate.

21. A raw fruit or vegetable juice composition inhibited against enzymatic browning, comprising a raw fruit or vegetable juice subject to enzymatic browning and an effective antibrowning amount of a browning inhibitor comprising first and second components, the first component being a soluble cyclodextrin and the second component being selected from ascorbic acid-2-phosphate esters, ascorbyl-6-fatty acid esters, and combinations thereof.

22. The raw fruit or vegetable juice composition of claim 21 wherein the soluble cyclodextrin is selected from the group consisting of (a) alpha cyclodextrin; (b) beta cyclodextrin; (c) gamma cyclodextrin; (d) derivatives thereof wherein one or more polar groups are attached to the parent cyclic molecule through covalent linkage with the oxygen atoms located on carbons 2, 3, or 6 of any of the glucose units comprising the alpha, beta and gamma cyclodextrin molecule; and (e) combinations thereof.

23. The raw fruit or vegetable juice composition of claim 22 wherein the polar groups are selected from the group consisting of monosaccharides, disaccharides, and oligosaccharides.

24. The raw fruit or vegetable juice composition of claim 22 wherein the polar groups are hydroxyalkyls wherein the alkyls have from 1 to 5 carbon atoms.

25. The raw fruit or vegetable juice composition of claim 21 wherein the composition further comprises a chelating agent.

26. The raw fruit or vegetable juice composition of claim 25 wherein the chelating agent is an acidic polyphosphate having a 1:1 ratio of $P_2O_5$:$Na_2O$.

27. The raw fruit or vegetable juice composition of claim 21 wherein the composition further comprises a polyphenol oxidase inhibitor.

28. The raw fruit or vegetable juice composition of claim 21 wherein the fatty acids of the ascorbyl-6-fatty acid esters are selected from the group consisting of palmitic, lauric, decanoic and octanoic acids.

* * * * *